United States Patent [19]

Wilson et al.

[11] 4,336,868

[45] Jun. 29, 1982

[54] COMPOSITE FIBROUS TUBE ENERGY ABSORBER

[75] Inventors: Henry E. Wilson; James D. Cronkhite, both of Hurst; John V. Howard, Arlington, all of Tex.

[73] Assignee: Textron, Inc., Providence, R.I.

[21] Appl. No.: 91,880

[22] Filed: Nov. 7, 1979

Related U.S. Application Data

[63] Continuation-in-part of Ser. No. 904,381, May 10, 1978, abandoned.

[51] Int. Cl.³ .............................................. F16F 7/12
[52] U.S. Cl. ................. 188/376; 244/100 R; 293/133; 297/472
[58] Field of Search ............... 74/492; 188/1 C, 297, 188/376; 244/100 R; 280/777, 784, 805; 293/133; 297/216, 472

[56] References Cited

U.S. PATENT DOCUMENTS

| | | | |
|---|---|---|---|
| 2,724,463 | 11/1955 | Becker | 188/1 C |
| 3,143,321 | 8/1964 | McGehee et al. | 188/1 C X |
| 3,314,720 | 4/1967 | Millington et al. | 188/1 C X |
| 3,410,511 | 11/1968 | Coppa | 188/1 C X |
| 3,670,852 | 6/1972 | Yarm | 188/1 C |
| 3,734,557 | 5/1973 | McKenzie | 188/1 C X |
| 3,868,141 | 2/1975 | Johnson | 188/1 C X |

FOREIGN PATENT DOCUMENTS

| | | | |
|---|---|---|---|
| 643203 | 6/1962 | Canada | 267/44 |
| 645207 | 7/1962 | Canada | 267/44 |
| 1011767 | 6/1977 | Canada | 267/61 |
| 1419268 | 12/1975 | United Kingdom | |

Primary Examiner—Duane A. Reger
Attorney, Agent, or Firm—Richards, Harris & Medlock

[57] ABSTRACT

High velocity impact landing forces are attenuated in apparatus (10) utilizing an energy absorbing tube (12) of composite fibrous material, that is, a fiber reinforced plastic. The energy absorbing tube (12) is disposed in force transmitting relation between an anvil (14) disposed at one end and structure (16) for applying a force to the opposite end of the tube (12) to provide force attenuating apparatus. The tube (12) is progressively crushed onto the anvil (14) by the force applying structure (16) to dissipate energy. The force attenuating apparatus (10) is used in an energy absorbing seat (20) to provide occupant protection against high impact forces. Other uses of the force attenuating apparatus (10) is in a landing gear mechanism (76) and a vehicle bumper system (89).

53 Claims, 29 Drawing Figures

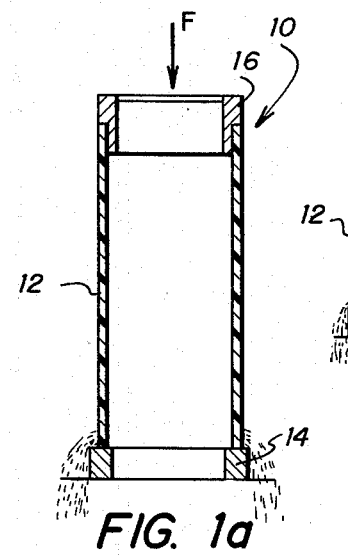
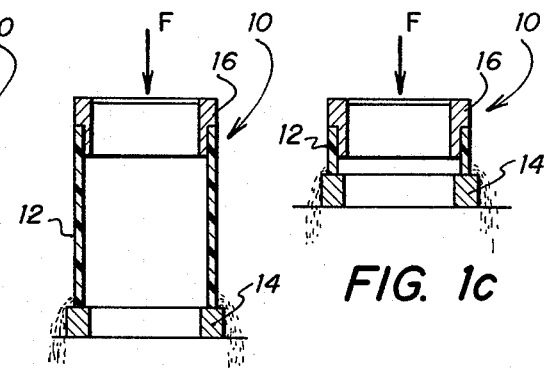
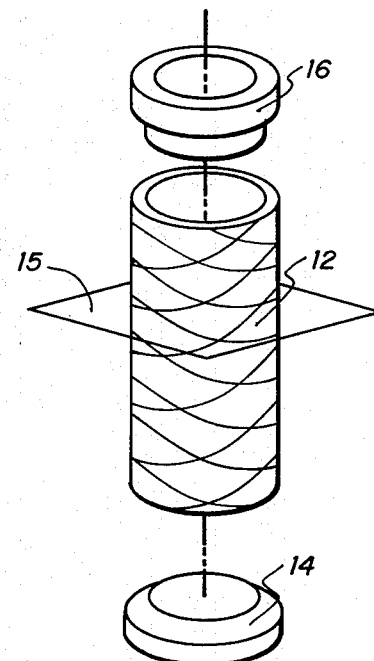
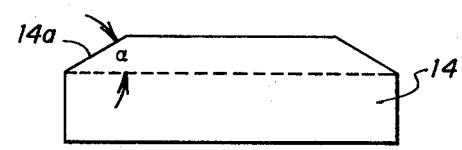
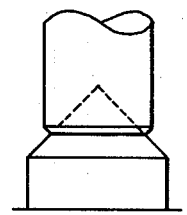
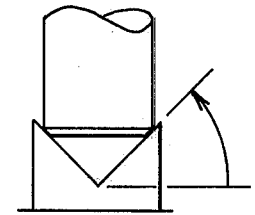

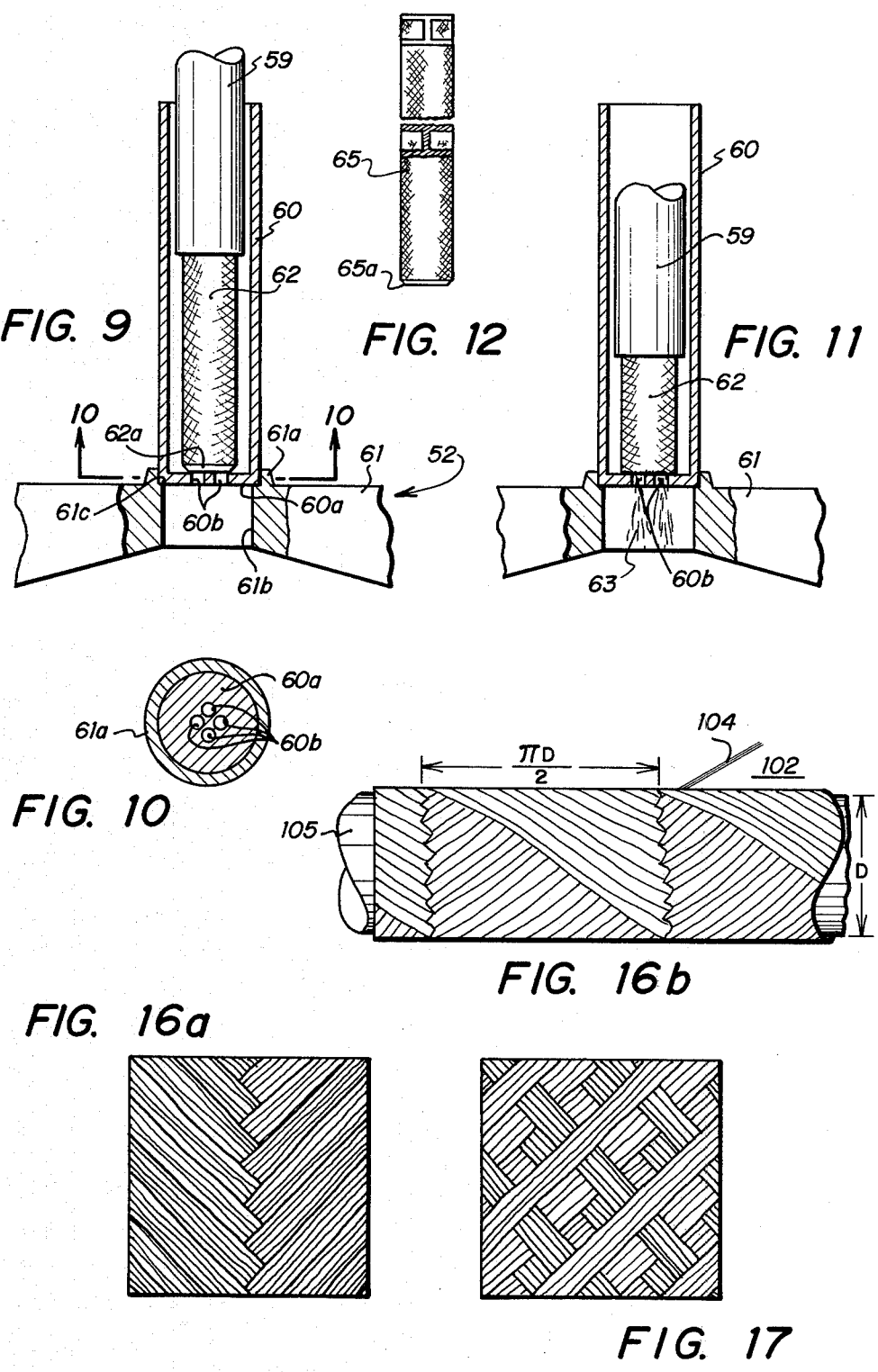

COMPOSITE FIBROUS TUBE ENERGY ABSORBER

This is a continuation-in-part of application Ser. No. 904,381, filed May 10, 1978 now abandoned.

TECHNICAL FIELD

The present invention relates to apparatus for attenuating forces by absorbing energy. More particularly, the invention relates to apparatus for attenuating forces generated upon high velocity impact, such as in crash situations.

In order to minimize crash damage to a vehicle and avoid injury to personnel in the vehicle, various force attenuation devices have been incorporated into the vehicle design. For example, seats in aircraft have incorporated energy absorbing mechanisms to cushion occupants of the aircraft from landing forces. Also, landing gear assemblies are provided with energy absorbing systems and structures.

BACKGROUND ART

Prior art force attenuation apparatus for aircraft seats have generally included a compressible corrugated aluminum cylinder in the seat height adjustment mechanism to serve as an energy absorber. Accordingly, under high impact landing conditions, energy is dissipated through the permanent deformation, or crushing, of the energy absorber.

Representative of prior art force attenuating apparatus for a landing gear assembly is the two-stage system of energy absorbers disclosed in U.S. Pat. No. 3,716,208. In that apparatus, the first stage of energy absorption involves driving a piston in an oil filled cylinder to move oil through control orifices and thereby reduce the forces applied to the airframe through the landing gear. The second stage of energy absorption involves actual deformation of the struts which connect the landing gear to the airframe.

Other means for attenuating forces generated upon landing of an aircraft with high vertical velocity is the crash attenuation landing gear disclosed in U.S. Pat. No. 3,997,133. In that patent, there is disclosed, in combination with a cushioned strut, an energy dissipation structure in the form of a relatively thin walled aluminum cylinder. The apparatus further includes a ring having a plurality of radial, upwardly facing cutter blades for engaging the inner wall of the cylinder to do mechanical work upon movement of the cylinder relative to the ring. More specifically, the mechanical work done by the ring is that of slicing the cylinder into longitudinal strips as relative movement takes place.

A modification of the cylinder-cutter structure is disclosed in the patent and involves the utilization of a flaring structure in place of the cutter ring. In the modified apparatus, as the cylinder is forced downward over the working surface of the flaring structure, the edges of the cylinder are flared and the cylinder is torn. The flaring operation absorbs energy, and thus attenuates forces.

Examples of energy absorbing systems as a vehicle bumper are those presently installed on passenger vehicles. Basically, such systems are hydraulic filled energy absorbing cylinders.

The application of reinforced plastics to automotive structures, where such structures provide crashworthiness, is the subject matter of a study sponsored by the U.S. Department of Transportation as reported in Report No. DOT HS-801 771, entitled "Feasibility Study of Plastic Automotive Structures". This report presents an in depth study of the use of plastic automotive structure to protect the passenger compartment during a frontal impact.

In accordance with the present invention, force attenuation apparatus is provided that may be readily adapted for use in various portions of an aircraft or other vehicle to attenuate forces developed during high velocity impact landing or stopping, by absorbing energy.

Force attenuating apparatus in accordance with the present invention utilizes an elongate member of composite, fibrous material disposed between an anvil at one end of the elongate member and means for applying a force to the opposite end of the composite elongate member. The force attenuation apparatus of the present invention dissipates energy as the means for applying force to the elongate member progressively crushes the member onto the anvil.

In accordance with the present invention, the elongate composite member is a closed or open section column whose wall comprises a fiber reinforced plastic whose fibers are at various angles with respect to a plane extending transverse to an axis of the elongate member. The anvil onto which the elongate member is crushed may have a flat surface or may be a conic with a positive or negative coning angle.

Suitable composite material for the elongate member of the force attenuation apparatus has been found to include graphite, fiberglass, boron and aramid type fibers in a plastic resin.

The present invention is envisioned as being utilized in various applications involving the attenuation of forces and dissipation of energy. Among such applications are energy absorbing landing gear assemblies for aircraft, energy absorbing seats for aircraft and other vehicles, energy absorbing vehicle bumpers and various other like applications.

BRIEF DESCRIPTION OF DRAWINGS

In order that the invention may be understood in detail, a detailed description of the invention is provided herein with reference to the general concepts and an illustrative embodiment thereof which are illustrated in the appended drawings, wherein:

FIGS. 1a, 1b and 1c illustrate the basic component parts of force attenuating apparatus in accordance with the present invention, and the operation thereof;

FIGS. 2a and 2b illustrate a modification of the apparatus shown in FIG. 1;

FIGS. 3a and 3b illustrate an anvil having a positive cone angle and a negative cone angle, respectively;

FIG. 9 is a cross-sectional view of an alternative embodiment of the energy absorbing member and related supporting structure for the energy absorbing seat shown in FIGS. 5 and 6;

FIG. 10 is a cross-sectional view of the anvil and vent holes shown in FIG. 9;

FIG. 11 is a cross-sectional view of the energy absorbing structure shown in FIG. 9 when the energy absorbing tube is being stroked;

FIG. 12 is a perspective view of an open cross section energy absorbing member;

FIGS. 16a and 16b illustrate a crossover winding pattern for the filament of an energy absorbing tube;

FIG. 17 illustrates a continuous crossover winding pattern for the filament of an energy absorbing tube;

DETAILED DESCRIPTION

Figure 4A:
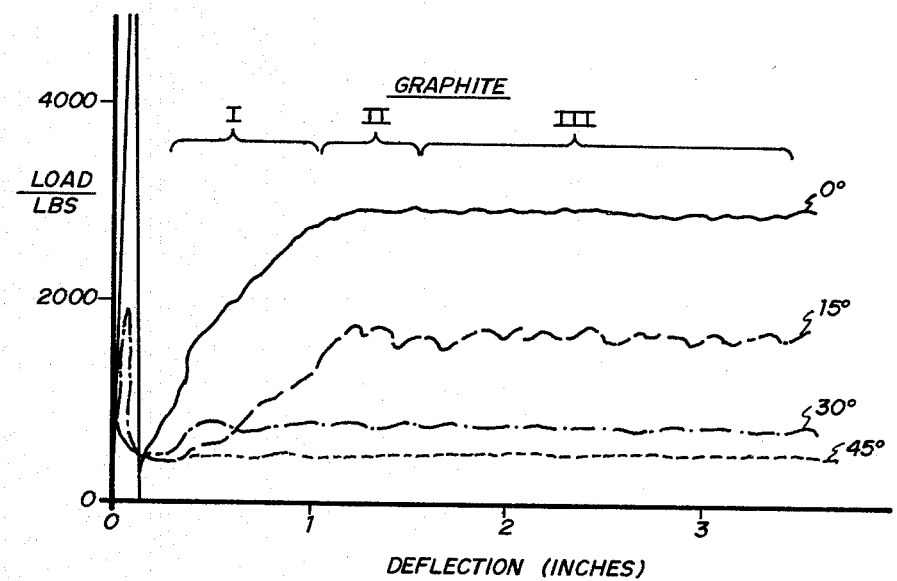
FIGS. 4a, 4b, 4c and 4d are graphs of the load-deflection curves for some fibrous materials used for the elongate composite member for apparatus of the present invention.

In accordance with the general principles of physics relating to work and energy dissipation, apparatus for attenuating forces during high velocity impact have involved the absorbing of energy by having the force of impact to do mechanical work.

A number of the techniques in the prior art for utilizing the concepts of work and energy dissipation have been noted. It is recognized in the prior art techniques that energy can be dissipated through the permanent deformation of a mass of material, typically an aluminum alloy extrusion.

Referring now to FIG. 1, there is diagrammatically illustrated an energy absorption force attenuation apparatus 10 in accordance with the present invention which comprises an elongate member 12 made of a composite fibrous material, such as a fiber reinforced plastic. An anvil 14 is axially aligned with member 12 and disposed adjacent one end of member 12. The force to be attenuated through the absorption of energy by fibrous member 12 is applied to the opposite end of member 12 by suitable means, such as insert 16 to progressively crush member 12 onto anvil 14 as shown in the series of illustrations of FIGS. 1a, 1b and 1c, thereby dissipating energy.

Referring to FIG. 2a, in accordance with the present invention the energy absorbing member 12 is preferably a composite material consisting of a mixture of fibers and resins. The fibers give the material the necessary strength to function as an energy absorber and the resin or "matrix" holds the fibers together and distributes applied loads to the fibers. Examples of fibers for use in the energy absorbing member 12 include a material from the group comprising graphite, Kevlar, fiberglass and boron. Either thermoset or thermoplastic resins are mixed with the fibers during the construction of the energy absorbing member. Examples of thermoset resins include polyesters, epoxies and phenolics, with the epoxies having excellent mechanical properties and dimensional stability. Thermoplastics include polystyrene, polycarbonate and polypropylene, along with others.

Depending on the fiber and the selected resin, different construction techniques are employed in the manufacture of the energy absorbing member 12. Typical of such construction techniques are filament or roving windings, tape or broad goods, laminate layup, pultrusion, chopped fiber molding, and pre- and post-forming. Each of these construction techniques has been extensively used in the production of manufactured goods consisting of a mixture of a fiber and a resin.

Another variable in the manufacture of the energy absorbing member 12 is the fiber orientation which affects the energy absorbing characteristics of the member. Fiber orientations include various combinations of unidirectional fibers oriented at angles of zero degrees to ninety degrees with respect to the column axis of the energy absorber or with respect to a transverse plane 15 as shown in FIG. 2a. To further control the energy absorbing characteristics of the member 12, the location of each fiber layer or lamina within the laminate is selected to achieve the desired laminate properties. If a spray-up or chopped fiber molding construction technique is employed, the fibers may be randomly oriented.

As illustrated in FIG. 2a, the energy absorbing member 12 has an open ended tubular configuration. Other configurations for the energy absorbing member 12 comprise open section configurations including angle members, T-shaped members, channel members, and "J", "I", or "Z"-shaped members. In addition to open sections, the energy absorbing member 12 is also constructed from closed sections and typical of such shapes are circular, elliptical, square or rectangular.

Samples of the energy absorbing member 12 were constructed for testing of the invention; these test members were open section cylinders as illustrated in FIG. 2a. Three different materials, graphite, Kevlar and fiberglass with an epoxy resin were used in constructing these samples. The test members were "filament wound" using a roving or bundle of fibers impregnated with a resin with the roving or bundle of fibers progressively wrapped at the desired orientation angle until a predetermined wall thickness was achieved. Properties of tubular members made from the three above types of composite material are presented in Table 1.

TABLE 1

| BASIC PROPERTIES OF COMPOSITE FIBROUS MATERIAL | | | |
|---|---|---|---|
| Material | Wall Thickness (Inches) | Weight (Lb./Inch) | Elastic Modulus |
| Graphite/epoxy | .033 | .01638 | $2.48 \times 10^6$ |
| Kevlar*/epoxy | .077 | .03212 | $1.09 \times 10^6$ |
| Fiberglass/epoxy | .031 | .01890 | $2.23 \times 10^6$ |

*(Kevlar-49 is a Dupont trademark)

The materials listed in Table 1 are fabricated into energy absorption members by winding the filament, tape, roving or cloth about a cylinder or other desired shaping form. Resin is applied along with the fiber and after the winding is completed, the fiber is cured. Before curing the resin to fiber weight ratio is about 40%/60% and after curing, the weight ratio is about 30%/70%. The volumetric ratio after curing is generally in the range of 35%-40% resin to 60%-65% fiber.

Based on tests run to date, the highest specific energy absorption (foot pounds/pounds of weight) was obtained from the graphite/epoxy mixture. From these tests, it appears that the specific energy absorption of a particular energy absorption member 12 is a function of how fine the material can be broken up during crushing. The graphite/epoxy tube, for example, was "powdered" whereas the Kevlar tube remained somewhat intact after crushing.

The type of material used for the energy absorbing member, such as graphite or Kevlar, and the orientation of the fibers is dependent on the application of the member. It has been found that graphite/epoxy energy absorbing tubes often produce stiff, sharp fragments when the tube is crushed but that when a Kevlar/epoxy tube is crushed, the resulting material is soft and pliable. Therefore, in applications where passengers could come into contact with a crushed energy absorbing tube, it would be preferable to use the Kevlar/epoxy type of tube to reduce the possibility of injury to passengers.

Although the end of anvil 14 adjacent member 12 is shown in FIG. 1 to be flat with a squared peripheral edge, a similar diagrammatic illustration in FIG. 2a of an energy absorption force attenuation apparatus in accordance with the present invention shows the edge of the anvil shaped in a configuration other than a flat plane. More particularly, the edge of the anvil 14 is beveled to form a truncated cone. The configuration of the anvil is more clearly shown in FIG. 2b. The angle of bevel 14a, represented by α in FIG. 2b is 45°.

Shaping the anvil onto which the energy absorbing member 12 is crushed into the cone configuration changes the crushing load for a particular size of member 12. Increasing the cone angle α from 0° to 45° causes the failure of the energy absorbing member 12 to crush at a lower load. Tests to substantiate this finding were conducted on energy absorbing members constructed with fibers oriented ±45° with respect to the transverse plane 15. In addition, the mode of failure became a progressive delamination rather than a progressive compressive crushing failure. However, this will depend on the fiber orientation with regard to the transverse plane 15. For example, fibers oriented parallel to the plane 15, that is, at an angle of 90° with respect to the member axis, will be broken rather than delaminated.

Referring to FIGS. 3a and 3b, there is illustrated both a positive cone angle for the anvil 14 and a negative cone angle, respectively. With the negative cone angle of FIG. 3b, crushing loads have been calculated to increase if the anvil is coned inward and thus increase the energy absorbing efficiency (energy absorbed per pound of weight) of the member 12.

An important indicia of the effectiveness of force attenuation apparatus is its specific energy absorption efficiency factor. The specific energy absorption efficiency factor is an indication of the force attenuation capability of a system in relation to its weight. The dimensions of the factor are foot pounds per pound of weight. It has been found that the specific energy absorption efficiency of a system in accordance with the present invention is dependent upon not only the material used, but the angle α, which describes the bevel of the edge of the truncated cone formed on the end of anvil 14 as shown in FIGS. 2a and 3.

Figure 4B:
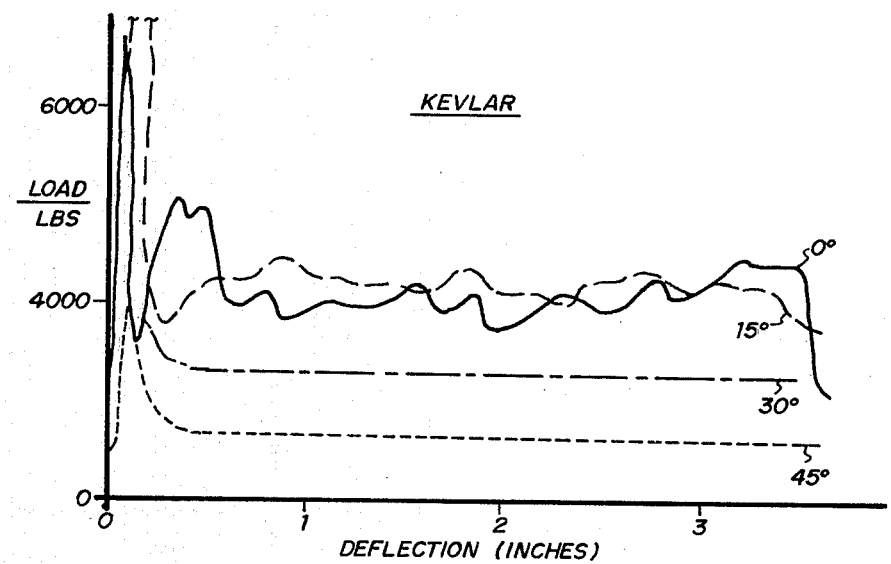
Figure 4C:
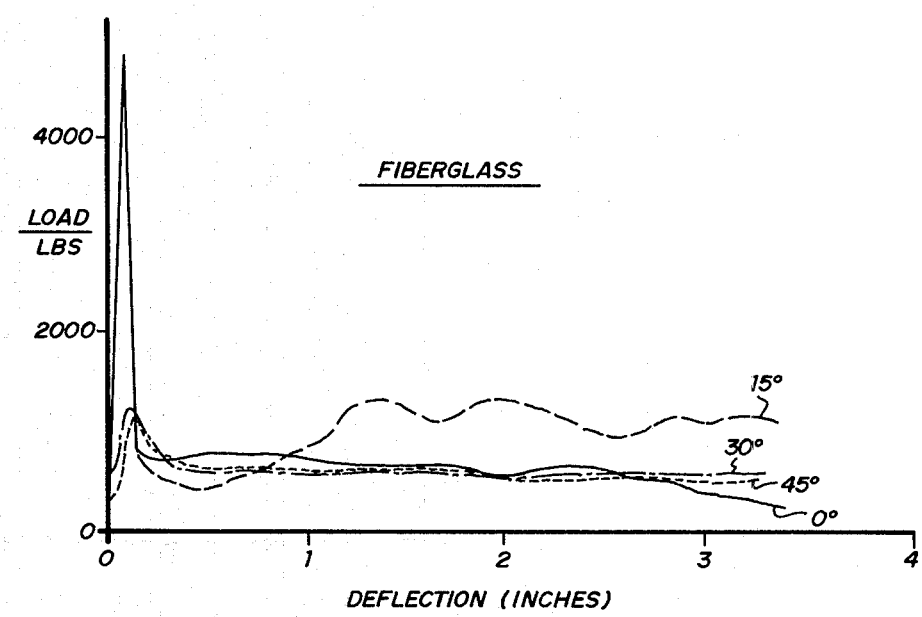
Figure 4D:
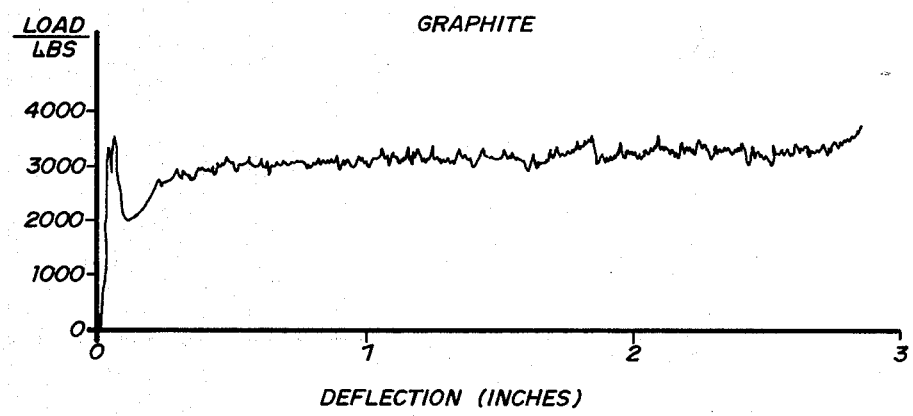

Typical static load deflection curves for tubes made of each type of composite material listed in Table 1 used with various degrees of anvil edge beveling are shown in FIGS. 4a, 4b and 4c. The graphs in FIGS. 4a, 4b and 4c are plots of load in pounds versus deflection in inches, i.e., the stroke or travel of force transmitting means 16. As will be noted, each of the curves for each material exhibits an initial peak and valley representing the initial peak failure load. From the graphs for each material, it will be apparent that the initially high peak failure load can be reduced by edge beveling of the end of the tube. As depicted in the representative graph of FIG. 4a, following the initial peak and valley, the load deflection curves exhibit a portion I reflecting travel of force transmitting means 16 relative to anvil 14, during which there is a buildup of the load force. A transition portion II of each load deflection curve turns into a linear portion III representative of the constant load maintained by the tubular member as the force transmitting means travels downwardly to progressively crush the tubular member onto anvil 14. For an energy absorbing member 12 having a beveled end, portion II of the curve is minimized leaving only portion III, as best illustrated in FIG. 4d for a graphite/resin tubular member.

The linear portion of the load defelction curves indicates that over essentially the entire length of the stroke of the force transmitting means, which stroke is equivalent to the length of the tubular member, the load is constant, thus absorbing energy efficiently.

From the static test data, the specific energy absorption efficiency for each system configuration can be calculated. The specific energy absorption efficiencies are presented in Table 2 for laminates of ±45° fiber orientation, and for comparison the specific energy absorption efficiency of a metal tube made of 3003-H14 aluminum alloy is also presented.

TABLE 2

| SPECIFIC ENERGY ABSORPTION (FT.-LB./LB.) | | | | |
|---|---|---|---|---|
| | Anvil End Configuration (α) | | | |
| Material | Flat | 15 | 30 | 45 |
| Graphite/epoxy | 15200 | 9200 | 4100 | 2300 |
| Kevlar/epoxy | 5900 | 5900 | 3500 | 1900 |
| Fiberglass/epoxy | 2600 | 5000 | 2600 | 2600 |
| 3003-H14 Al | 7800 | — | — | — |

The accuracy of the static load deflection curves of FIGS. 4a, 4b, 4c and 4d, as an indication of the effectiveness of the present invention for a dynamic load application, was checked by conducting drop tests utilizing a graphite/epoxy tubular member having its filaments wound at approximately 45° to a plane transverse to the line of action of the applied force. The tubular member was impacted with a 122 pound mass dropped from two feet. Including the tube deflection, the full drop height was 25.7 inches. The impact velocity of the mass was about twelve feet per second. The apparatus successfully attenuated the full 242 foot-pounds of energy without any rebound.

Using the energy from the area under the static load-deflection curve of FIG. 4a and an anvil bevel of 0°, a 1.63 inch stroke was predicted. The dynamic drop measured a 1.75 inch stroke, indicating that the static load deflection information would be representative for dynamic loading.

In order to show a representative application of the present invention and illustrate its utility, an energy absorbing seat 20 is shown in FIGS. 5-8. The energy absorbing seat includes a seat support frame generally designated at 22 having feet 24 for placement on a surface. A contoured seat portion 26 is also included and carried on seat support frame 22 in a manner to be described.

Figure 5:
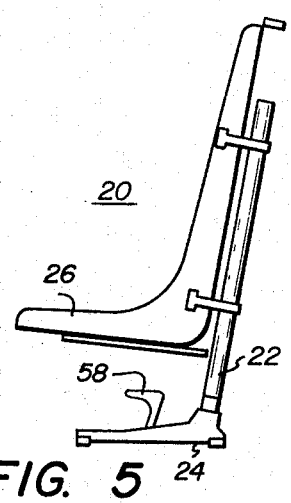
FIG. 5 is a side view of an energy absorbing seat incorporating the force attenuating apparatus of the present invention.
Figure 6:
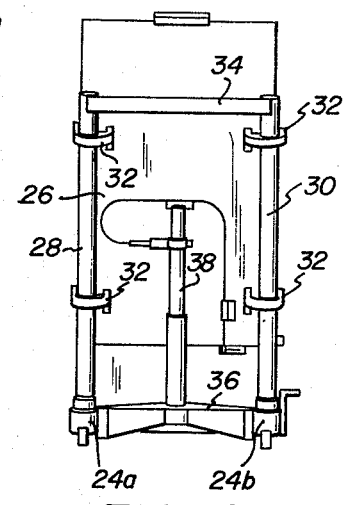
FIG. 6 is a rear view of the energy absorbing seat of FIG. 5.

Referring next to FIGS. 5 and 6, seat support frame 22 is shown in greater detail as having extension support arms 28 and 30 extending from feet 24a and 24b, respectively. Attached to the extension arms 28 and 30 is the seat portion 26 by means of straps 32. An upper support channel 34 interconnects the two extension arms 28 and 30 and an attenuation brace 36 is bolted between the feet 24a and 24b. Force attenuation apparatus 38 is provided and bolted between the attenuation brace 36 and the back surface of the seat portion 26. Basically, the attenuation apparatus comprises an elongate member of a composite material such as previously described. It is connected in a force transmitting relation between the seat portion 26 and the attenuation brace 36.

Figure 7:
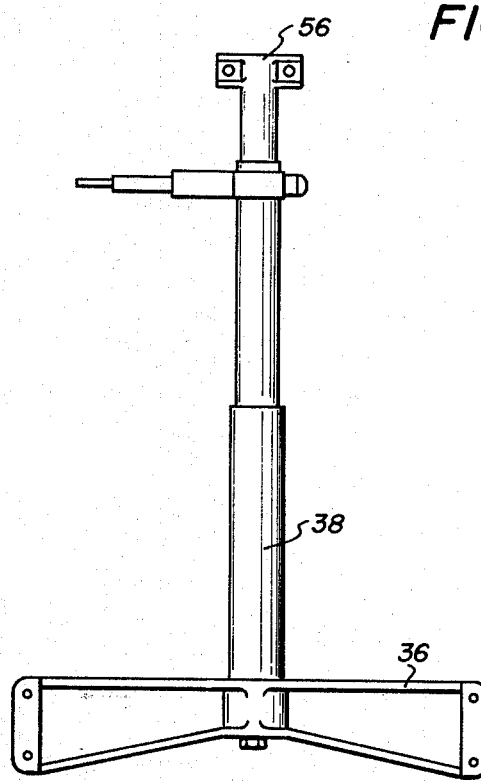
FIG. 7 is a detailed view of the energy absorbing apparatus of the seat shown in FIG. 5.
Figure 8:
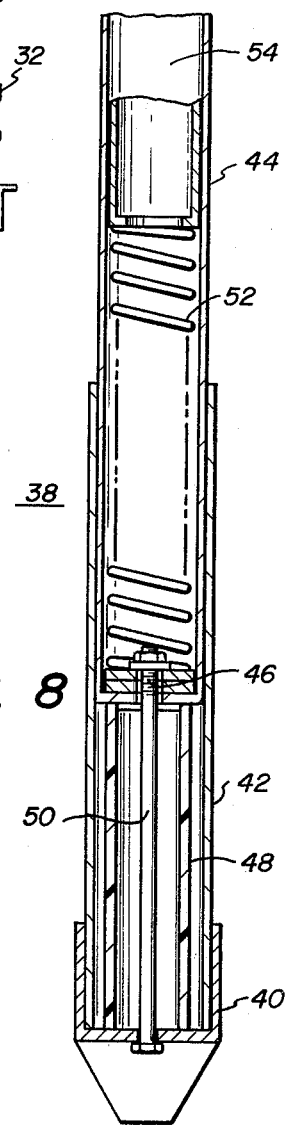
FIG. 8 is a cross-sectional view of one suitable force attenuating apparatus for use in the energy absorbing seat shown in FIGS. 5 and 6.

Referring to FIGS. 7 and 8, there is shown in detail the force attenuation apparatus 38 attached to the attenuation brace 36. At the lower end of the attenuation apparatus 38, there is provided a cup-shaped end support 40 having mounted therein a static cylinder 42 that is concentric with an inner cylinder 44. The inner cylinder 44 terminates in a closed end 46 that functions as a force transmitting element from the seat portion 26 to an energy absorbing member 48 mounted within the cylinder 42. The energy absorbing member 48 is of the type illustrated and described in FIGS. 1 and 2. The structures of the cylinders 42 and 44 and the energy absorbing member 48 are assembled into a working relationship by means of a fastener 50.

In the embodiment of the force attenuation apparatus shown in FIGS. 7 and 8, the inner cylinder 44 is equipped with a spring 52 as part of a shock absorber between the inner cylinder 44 and a tube 54 terminating in a bracket 56 directly bolted to the back of the seat 26.

Operationally, during a high velocity impact landing situation, in which high impact forces are developed that would otherwise be transmitted to personnel in seat portion 26, seat portion 26 would cause the inner cylinder 44 to progressively crush the energy absorbing member 48, thereby dissipating energy and attenuating the impact force.

Upon extreme deceleration of an aircraft having energy absorbing seat 20 mounted therein, deceleration forces will be developed and applied through seat portion 26 to force transmitting means 38. More specifically, and with regard to the illustrated force transmitting means in FIGS. 6, 7 and 8, the force will urge seat portion 26 downwardly relative to the attenuation brace 36, causing the inner cylinder 44 to move downwardly therewith relative to the cylinder 42. Movement of the inner cylinder 44 downwardly will result in the crushing of the energy absorbing member 48 against the end support 40, which end acts as an anvil. Accordingly, energy absorbing member 48 dissipates energy and attenuates the deceleration forces applied to seat 26 and consequently to the passenger seated therein.

Referring once again to FIG. 5, in the embodiment shown, energy absorbing seat 20 may be further provided with a conventional seat adjustment mechanism 58 whereby the height of seat portion 26 relative to the supporting surface may be adjusted.

Although the composite material energy absorbers utilized in energy absorbing seat 20 are shown incorporated in a separate mechanism, it is to be appreciated that the force attenuation apparatus of the present invention may be incorporated in other ways.

The present invention in its utilization of composite material in energy dissipating force attenuation apparatus provides several advantages over the aluminum alloy energy absorbers heretofore used.

As indicated in the tabular data of Table 2, the specific energy absorption efficiency of a composite material, especially graphite, is superior to that achieved with metal. That is, composite fibrous materials provide more force attenuation for a given amount of weight. Especially in the aircraft industry, such achievement represents a significant contribution to the art.

It is also an advantage of this invention that the dissipation of energy is greatly enhanced by the ability to completely destroy the material throughout 100% of the stroke. It is, of course, the case that corrugated aluminum and other metals do not exhibit complete destruction or 100% deflection. Accordingly, from the basic principles of physics, the full extent of available work and energy dissipation available over the stroke distance cannot be fully achieved with metal as it can be with composite material. This is significant in that occupants of an aircraft will be decelerated over only a portion of the stroke distance, and they will undergo higher and more dangerous forces.

A further advantage of the present invention is that the force attenuation apparatus will be unaffected by environmental conditions, such as corrosion and the like.

An alternative embodiment to the energy absorbing structure of the seat shown in FIGS. 5-8 is illustrated in FIGS. 9-11. An inner tube 59 is substituted for tube 44 shown in FIG. 8. Tube 59 works within an outer tube 60 which is secured to an attenuation brace 61 which is substituted in place of attenuation brace 36 shown in FIG. 6. Brace 61 includes a shoulder 61a which is dimensioned to receive tube 60. An opening 61b is provided in brace 61 at the base of tube 60 which is supported by a step 61c.

Inner tube 59 is in axial contact with an energy absorbing graphite tube 62 which extends to a baseplate 60a which is joined to the lower end of tube 60. The base of tube 62 is formed to have a beveled face 62a which is in contact with the baseplate 60a. The baseplate 60a serves the same function as the anvil 14 shown in FIGS. 1-3. A plurality of vent holes 60b are formed through the baseplate 60a to receive the pulverized material produced when graphite tube 62 is stroked.

Referring to FIG. 10, the baseplate 60a is shown to have the four vent holes 60b uniformly spaced therethrough. The stroking of tube 62 during impact is illustrated in FIG. 11. When a force is applied to drive the inner tube 59 downward against the energy absorbing tube 62, such as caused by a hard landing, the tube 62 will be progressively disintegrated against the baseplate 60a. The beveled face 62a will first be broken up and due to its beveled configuration will prevent the transmission of a heavy impulse force to the seat structure. After the beveled face is disintegrated the tube 62 will be progressively broken up from the base of tube 62 upward by an upward progression of microfractures. As the tube 62 is driven against the baseplate 60a there will be produced a particulate matter 63 which will be expelled through vent holes 60b. Since the particulate matter 63 is expelled from tube 60, the inner tube 59 can be stroked through the full length of energy absorption tube 62. This ensures that there will be the maximum energy attenuation provided by tube 62. Each of the energy absorbing structures disclosed herein can be provided with vent holes as shown in FIG. 11.

A further embodiment of an energy absorbing tube in accordance with the present invention is shown in FIG. 12. An energy absorbing member 65 is an I-shaped member fabricated of the same fabric and resin material described for the above energy absorber embodiments. The lower end member 65 is provided with a beveled portion 65a to reduce the initial shock transmitted through member 65. The member 65 can be substituted for any of the energy absorbing members described above and is particularly applicable for use in the same place as member 62 in the energy absorbing seat structure illustrated in FIG. 11.

The foregoing description of illustrative embodiments of the present invention has been directed to but one application of the present invention; however, the present invention may be utilized in various other applications involving the need and desire for the attenuation of forces and dissipation of energy. Among such other applications are energy absorbing landing gear for aircraft and engine and transmission supports in aircraft, as well as vehicle bumper systems.

Figure 13:
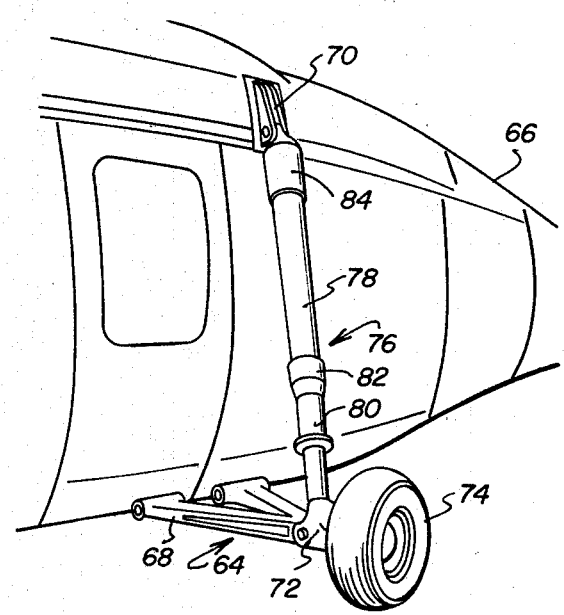
FIG. 13 is a perspective view of a landing gear support for a helicopter incorporating the energy attenuating apparatus of the present invention.
Figure 14:
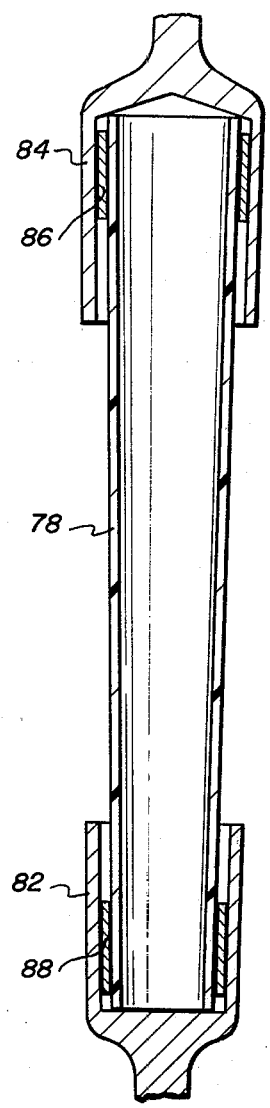
FIG. 14 is a cross-sectional view, partially cut away, of the energy absorbing apparatus of the landing gear support of FIG. 12.

Referring to FIGS. 13 and 14, there is shown force attenuation apparatus of the present invention as part of a landing gear assembly. The landing gear assembly 64 is shown attached to the fuselage 66 of a helicopter by means of a pivot arm 68 and a support bracket 70. At the outboard end of the pivot arm 68 there is pivotally attached an axle assembly 72 supporting a wheel 74. Coupled between the axle assembly 72 and the support bracket 70 is a force attenuating apparatus 76 that includes an energy absorbing member 78 and an oleopneumatic shock strut 80. The shock strut 80 is conventional hardware with a retention cup 82 formed as an integral part of the strut housing. Mounted within the cup 82 is the energy absorbing member 78 that is fitted at its upper end into a retention cup 84 that is pivotally mounted to the support bracket 70.

Referring specifically to FIG. 14, the energy absorbing member 78 has an inward taper throughout its length from the end fitted into the retention cup 84 to the lower end at the retention cup 82. To secure the upper end of the energy absorbing member 78 into the retention cup 84, a retaining ring 86 is assembled between the member and the inner diameter of the retention cup. Similarly, a retaining ring 88 is assembled between the energy absorbing member 78 and the inner wall of the retention cup 82.

Operationally, the retention cup 84 functions as the force transmitting element and the retention cup 82 functions as an anvil. During a high impact landing or a crash situation for a vehicle having the landing gear assembly of FIG. 13 mounted thereto, the deceleration forces will be developed and applied through the retention cup 84 to the energy absorbing member 78. This force will urge the energy absorbing member 78 downwardly relative to the retention cup 82. Movement of the retention cup 84 relative to the retention cup 82 will result in the crushing of the energy absorbing member 78 against the cup 82 functioning as an anvil. Accordingly, the energy absorbing member 78 dissipates energy and attenuates the deceleration forces applied to the fuselage 66.

Figure 15:
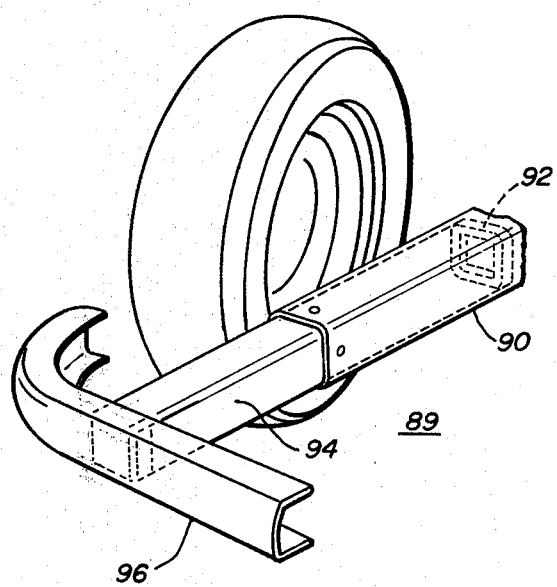
FIG. 15 is a perspective view of a vehicle bumper system incorporating a rectangularly shaped energy absorbing member as a part of energy absorbing apparatus of the present invention.

The present invention, though particularly suited for aircraft applications due to the great force attenuation capability and relatively light weight provided, is nonetheless also readily applicable to ground transportation vehicles as well. Referring to FIG. 15, there is schematically illustrated a vehicle bumper assembly 89 incorporating the force attenuating apparatus of the present invention. An existing frame member 90 extends from the conventional vehicle frame as part of the bumper assembly. Welded or otherwise secured within the frame member 90 is an anvil 92 as part of the force attenuating apparatus. In the illustrated application of the force attenuating apparatus, an energy absorbing member 94 is configured to be mounted within the frame member 90 having an inner end in contact with the anvil 92. As shown, the member 94 is rectangular in shape with rounded corners. Typically, the energy absorbing member 94 is made of a graphite/epoxy composition by a pultrusion manufacturing technique.

Attached to the outer end of the energy absorbing member 94 is a vehicle bumper 96 that is carried by the member in a normal bumper relationship with the vehicle. The energy absorbing member 94 carries normal axial and bending loads without stroking or crushing against the anvil 92. Only during high energy impact conditions when the force applied through the bumper 96 to the energy absorbing member 94 exceeds the threshold of the graphite/epoxy material will the member 94 begin to crush against the anvil 92. During this high energy impact or crash condition, the energy absorbing member 94 progressively crushes against the anvil 92 thereby absorbing the high impact energy.

One of the techniques for producing the energy absorbing tube in accordance with the present invention is illustrated in FIGS. 16a and 16b. This is a crossover technique of filament winding which produces the fiber pattern shown in FIG. 16a and the energy absorbing tube 102 shown in FIG. 16b. Note that the pattern has a basic length of $\pi D/2$. A fiber tow line 104 comprising a bundle of fibers is drawn onto a mandrel 105 which is rotated to pull the tow line filaments. The external diameter of the mandrel is shown by the dimension D. The result of the layup is the production of the energy absorbing tube 102 having the fiber configuration shown in detail in FIG. 16a.

An energy asorbing tube can also be produced using the mandrel 105 and having a continuous crossover pattern which is shown in FIG. 17.

Figures 18A, 18B:
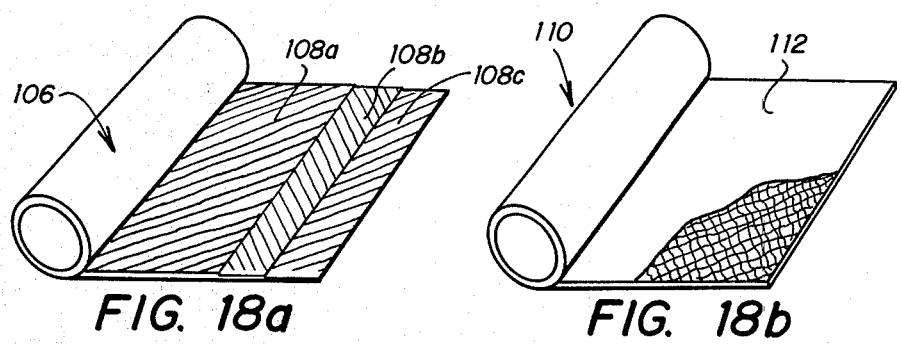
FIGS. 18a and 18b illustrate rolled tape and rolled fabric energy absorption tubes.

A composite energy absorbing tube for use in accordance with the present invention can be produced by using rolled fiber as shown in FIGS. 18a and 18b. A tube 106 is produced by wrapping rolled tape 108 until the desired thickness of the tube wall is achieved. Tape 108 has fiber layers 108a, 108b and 108c. A similar tube structure 110, FIG. 18b, is produced by wrapping rolled fabric 112 until the desired tube wall thickness is produced.

Figure 19:
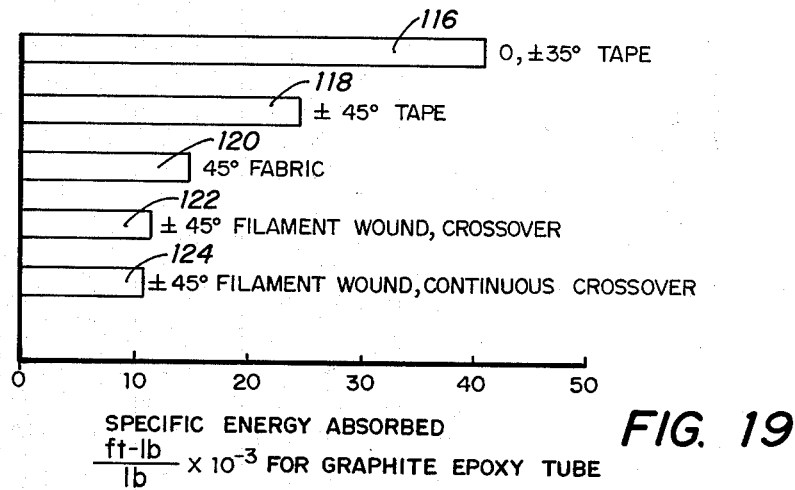
FIG. 19 is a graph illustrating the specific energy absorption for various energy absorption tube configurations.

As illustrated in FIG. 1, the energy absorbing tube embodiment of the present invention can be produced by wrapping filament or tape at any desired angle relative to the axis of the tube. In FIG. 19 there is illustrated a graph which shows the specific energy absorption capabilities for various configurations of graphite/epoxy energy absorbing tubes. The bar lines 116–124 illustrate respectively the specific energy absorption for ±35° tape, ±45° tape, 45° fabric, ±45° filament wound crossover (see FIGS. 16a and 16b) and ±45° filament wound continuous crossover (see FIG. 17).

Figure 20:
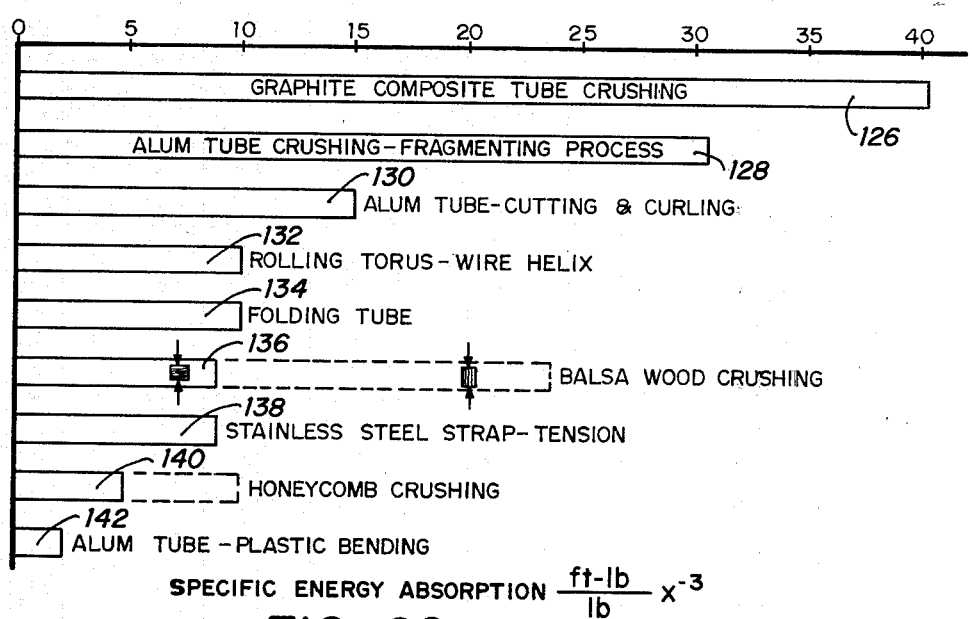
FIG. 20 is a graph comparing the specific energy absorption of the graphite/epoxy tube of the present invention with various other energy absorbing structures.

The effectiveness of the present invention as compared to various other types of energy absorbing structures is shown in FIG. 20. Bar 126 shows that a graphite composite tube as disclosed herein has a specific energy absorption of approximately 40,000 ft-lbs per pound of material. This is approximately 30% more than a fragmentation aluminum tube such as shown in bar 128. The remaining energy absorbers shown by bars 130–142 have substantially less energy absorbing capability.

These and other applications of the invention, as well as modifications to the illustrative embodiment described herein, will be apparent to those skilled in this art. It is the applicants' intention in the following claims to cover the present invention in all such uses, and with all modifications, as fall within the scope of the invention.

What is claimed is:

1. Force attenuation apparatus, comprising:
   an elongate member of a composite material comprising load-bearing fibers bonded by a resin;
   an anvil axially aligned with said member and disposed adjacent one end thereof; and
   means for applying force to the end of said elongate member opposite said anvil to progressively disintegrate said member at the face of said anvil.

2. The force attenuation apparatus of claim 1 wherein said elongate composite member is a tube.

3. The force attenuation apparatus of claim 1 wherein said fibers comprise a plurality of filaments oriented at a selected angle with respect to a plane extending transverse to an axis of said member.

4. The force attenuation apparatus of claim 1 wherein the face of said anvil is flat.

5. The force attenuation apparatus of claim 1 wherein said anvil has a truncated cone around the periphery of the end adjacent said elongate member.

6. The force attenuation apparatus of claim 1 wherein said anvil has an inverted cone at the end adjacent said elongate member.

7. The force attenuation apparatus of claim 1 wherein said elongate member has a bevel formed on the end thereof facing said anvil.

8. The force attenuation apparatus of claim 1 wherein the face of said anvil has an annular taper at an angle that is greater than 0° and less than 90° relative to a plane transverse to the axis of said anvil.

9. The force attenuation apparatus of claim 1 wherein each anvil is provided with a plurality of vent holes in the face thereof for expelling through said holes at least a portion of the disintegrated matter of said member when said member is disintegrated against said anvil.

10. The force attenuation apparatus of claim 1 wherein the load-bearing fibers comprise graphite.

11. The force attenuation apparatus of claim 1 wherein the load-bearing fibers comprise fiberglass.

12. The force attenuation apparatus of claim 1 wherein the load-bearing fibers comprise an aramid type fiber.

13. The force attenuation apparatus of claim 1 wherein the load-bearing fibers comprise boron.

14. Force attenuation apparatus, comprising in combination:
   a tubular member comprising a filament wound about the axis of said member at a selected angle with respect to a plane extending transverse to the axis of said member, said filament bonded together by a resin;
   an anvil axially aligned with said member and disposed adjacent one end thereof; and
   means for applying a compressive force to said member to progressively disintegrate said member at the face of said anvil.

15. Force attenuation apparatus of claim 14 including a second filament wound about the axis of said member at a second selected angle with respect to said plane.

16. Force attenuation apparatus of claim 14 wherein the end of said member facing said anvil is beveled to reduce the initial shock transmitted through said member when said member is driven against said anvil.

17. The force attenuation apparatus of claim 14 wherein said anvil is provided with a plurality of vent holes in the face thereof for expelling through said holes at least a portion of the disintegrated matter of said member when said member is disintegrated against said anvil.

18. Force attenuation apparatus comprising in combination:
   an elongate member having a longitudinal channel and an open cross-section, said member comprising a plurality of load-bearing filaments bonded together with a resin;
   an anvil axially aligned with said member and disposed adjacent one end thereof; and
   means for applying a compressive force to said member to progressively disintegrate said member at the face of said anvil.

19. Force attenuation apparatus of claim 18 wherein the end of said member facing said anvil is beveled to reduce the initial shock transmitted through said member when said member is driven against said anvil.

20. The force attenuation apparatus of claim 18 wherein said anvil is provided with a plurality of vent holes in the face thereof for expelling through said holes at least a portion of the disintegrated matter at said member when said member is disintegrated against said anvil.

21. Force attenuating apparatus comprising:
   an elongate member comprising fibers wound at one or more predetermined angles to the axis of the member, said fibers bonded together by a resin;
   an anvil axially aligned with said member and disposed adjacent one end thereof, said anvil having a plurality of apertures extending therethrough, said apertures aligned parallel with the axis of said member; and
   means for applying force to the end of said member opposite said anvil to progressively disintegrate said member at the face of said anvil wherein the disintegrated matter of said member being at least partially expelled through said apertures.

22. The force attenuation apparatus of claim 21 wherein said elongate member is a tube.

23. The force attenuation apparatus of claim 21 wherein the end of said member which is disposed adjacent said anvil at least partially covers said apertures.

24. The force attenuation apparatus of claim 21 wherein said anvil is joined to the end of a tubular housing having said member disposed therein.

25. The force attenuation apparatus of claim 21 wherein said elongate member has a bevel formed on the end thereof facing said anvil to reduce the initial shock transmitted through said member when said member is driven against said anvil.

26. An energy absorbing seat, comprising:
 a seat support frame having feet for placement on a surface;
 a seat portion mounted on said support frame for relative downward movement;
 an energy absorber disposed in a force transmitting relation between said frame and said seat portion;
 said energy absorber comprising an elongate member of a composite material comprising load-bearing fibers bonded by a resin;
 an anvil supported from said frame and axially aligned with said member; and
 means joined to said seat portion for applying force to the end of said member opposite said anvil to progressively disintegrate said member at the face of said anvil when said seat portion moves downward relative to said frame.

27. The energy absorbing seat of claim 26 wherein said elongate member is a tube.

28. The energy absorbing seat of claim 26 wherein said elongate member has a bevel formed on the end thereof facing said anvil.

29. The energy absorbing seat of claim 26 wherein said anvil is provided with a plurality of vent holes in the face thereof for expelling through said holes at least a portion of the disintegrated matter of said member when said member is disintegrated against said anvil.

30. An energy absorbing seat, comprising:
 a seat support frame having first and second substantially parallel extensions, each extension having a foot on the lower end for placement on a surface;
 first and second tubular members coaxially mounted to move one within the other, one of said members attached to the foot of each extension;
 an energy absorber of composite material comprising load-bearing fibers bonded by a resin, said absorber configured as an elongate member and disposed in a force transmitting relation between an anvil in one of the tubular members and the upper end surface in the second of said tubular members;
 a seat portion mounted to said second tubular member; and
 said energy absorber driven against said anvil when said seat portion is forced downward relative to said surface to progressively disintegrate said energy absorber at the face of said anvil.

31. The energy absorbing seat of claim 30 wherein said elongate member has a bevel formed on the end thereof facing said anvil.

32. The energy absorbing seat of claim 30 wherein said anvil is provided with a plurality of vent holes in the face thereof for expelling through said holes at least a portion of the disintegrated matter of said member when said member is disintegrated against said anvil.

33. Force attenuating apparatus having an energy absorbing member, means for transmitting force to one end of said member, and an anvil on the opposite side of said energy absorbing member from said force transmitting means, characterized in that said energy absorbing member is made of a composite material comprising load-bearing fibers bonded by a resin, said energy absorber driven against said anvil by said means for transmitting force to progressively disintegrate said energy absorber at the face of said anvil.

34. The force attenuating apparatus of claim 33 wherein the energy absorbing member is a tube.

35. The force attenuating apparatus of claim 34 wherein said fibers comprise filaments wound at a selected angle with respect to a plane transverse to the longitudinal axis of the elongate member.

36. The force attenuation apparatus of claim 33 wherein the load-bearing fibers comprise graphite.

37. The force attenuation apparatus of claim 33 wherein the load-bearing fibers comprise fiberglass.

38. The force attenuation apparatus of claim 33 wherein the load-bearing fibers comprise an aramid type fiber.

39. The force attenuation apparatus of claim 33 wherein the load-bearing fibers comprise boron.

40. The force attenuating apparatus of claim 33 wherein said energy absorbing member has a bevel formed on the end thereof facing said anvil.

41. The force attenuation apparatus of claim 33 wherein said anvil is provided with a plurality of vent holes in the face thereof for expelling through said holes at least a portion of the disintegrated matter of said member when said member is disintegrated against said anvil.

42. A landing gear for an aircraft, comprising:
 means for providing a primary support to the aircraft when in contact with a landing surface;
 first coupling means for providing an attachment of said means for supporting to the fuselage of the aircraft;
 second coupling means including force attenuation apparatus for providing a second attachment of said means for supporting the fuselage to the aircraft; and
 the force attenuation apparatus including an elongate member of composite material comprising load-bearing fibers bonded by a resin, an anvil axially aligned with said member and disposed adjacent one end thereof, and means for applying force to the end of said elongate member opposite said anvil to progressively disintegrate said member at the face of said anvil.

43. The landing gear of claim 42 wherein said elongate member has a bevel formed on the end thereof facing said anvil.

44. The landing gear of claim 42 wherein said second coupling means includes a shock strut disposed between said means for supporting and the force attenuation apparatus.

45. The landing gear of claim 44 wherein said elongate member has an inward taper from the end at said means for applying force to the end at said anvil.

46. The landing gear of claim 42 wherein said fibers comprise a plurality of filaments oriented on a selected angle with respect to a plane extending transverse to the axis of said elongate member.

47. The landing gear of claim 42 wherein said anvil is provided with a plurality of vent holes in the face thereof for expelling through said holes at least a portion of the disintegrated matter of said member when said member is disintegrated against said anvil.

48. A vehicle bumper system, comprising:
 a frame extension forming an integral part of the main frame of the vehicle;
 force attenuation apparatus coupled to said frame extension, said force attenuation apparatus including an energy absorbing member comprising load-bearing fibers bonded by a resin, an anvil in engagement with one end of said member, and means for applying a force to the end of said elongate member opposite said anvil to progressively disintegrate said member at the face of said anvil; and a bumper fastened to said force attenuation apparatus.

49. The vehicle bumper system of claim 48 wherein said anvil is attached to said frame extension and said bumper is fastened to said means for applying force.

50. The vehicle bumper system of claim 48 wherein said energy absorbing member has a generally rectangular configuration.

51. The vehicle bumper system of claim 48 wherein said energy absorbing member is a graphite/epoxy resin composition.

52. The vehicle bumper system of claim 48 wherein said energy absorbing member has a bevel formed on the end thereof facing said anvil.

53. The vehicle bumper system of claim 48 wherein said anvil is provided with a plurality of vent holes in the face thereof for expelling through said holes at least a portion of the disintegrated matter of said member when said member is disintegrated against said anvil.

* * * * *